US008261771B2

United States Patent
Witkowski et al.

(10) Patent No.: US 8,261,771 B2
(45) Date of Patent: Sep. 11, 2012

(54) FLOWLINE FLAPPER VALVE

(75) Inventors: Brian C. Witkowski, Weatherford, TX (US); Nuder M. Said, Arlington, TX (US)

(73) Assignee: S.P.M. Flow Control, Inc., Fort Worth, TX (US)

( * ) Notice: Subject to any disclaimer, the term of this patent is extended or adjusted under 35 U.S.C. 154(b) by 118 days.

(21) Appl. No.: 12/763,786

(22) Filed: Apr. 20, 2010

(65) Prior Publication Data
US 2010/0263744 A1 Oct. 21, 2010

Related U.S. Application Data

(60) Provisional application No. 61/170,917, filed on Apr. 20, 2009.

(51) Int. Cl.
*F16K 15/02* (2006.01)
(52) U.S. Cl. .................... 137/527.2; 251/363
(58) Field of Classification Search .......... 137/527, 137/527.2, 527.4, 527.8; 251/363
See application file for complete search history.

(56) References Cited

U.S. PATENT DOCUMENTS

| 345,420 | A | * | 7/1886 | Eskholme | 137/527.2 |
| 2,717,001 | A | * | 9/1955 | Perrault | 137/514 |
| 3,934,608 | A | * | 1/1976 | Guyton | 137/527.8 |
| 3,974,848 | A | | 8/1976 | Wheatley | |
| 4,842,014 | A | * | 6/1989 | Strelow et al. | 137/527.2 |
| 5,056,548 | A | | 10/1991 | Mills | |
| 5,143,112 | A | | 9/1992 | Scaramucci | |
| 5,161,566 | A | | 11/1992 | Scaramucci | |
| 5,161,570 | A | | 11/1992 | Scaramucci | |
| 5,307,835 | A | | 5/1994 | Scaramucci | |
| 5,386,847 | A | | 2/1995 | Scaramucci | |
| 5,584,315 | A | | 12/1996 | Powell | |
| 5,947,152 | A | | 9/1999 | Martin et al. | |
| 6,948,526 | B2 | | 9/2005 | Seder et al. | |
| 2006/0283513 | A1 | | 12/2006 | Kurian et al. | |
| 2007/0272308 | A1 | | 11/2007 | Spears et al. | |

OTHER PUBLICATIONS

International Search Report and Written Opinion dated Dec. 27, 2010.

* cited by examiner

*Primary Examiner* — Kevin Lee
*Assistant Examiner* — Macade Brown
(74) *Attorney, Agent, or Firm* — Bracewell & Giuliani LLP

(57) ABSTRACT

A check valve assembly has a body having a central cavity intersected by upstream and downstream flow passages. A seat is secured by a threaded engagement in the upstream flow passage. An access bore intersects the cavity and has a support shoulder formed in it. A holder is supported on the support shoulder. A flapper is pivotally secured to the holder and located in the cavity for movement between an open position and a closed position blocking flow through the seat. A straight edge portion in the access bore engages a straight edge portion of the holder to prevent rotation of the holder. A fastener extends through a hole in the support shoulder into engagement with the seat to prevent rotation of the seat.

18 Claims, 4 Drawing Sheets

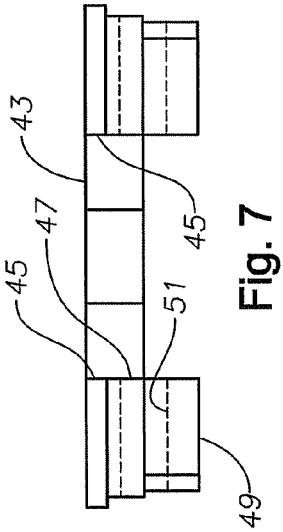
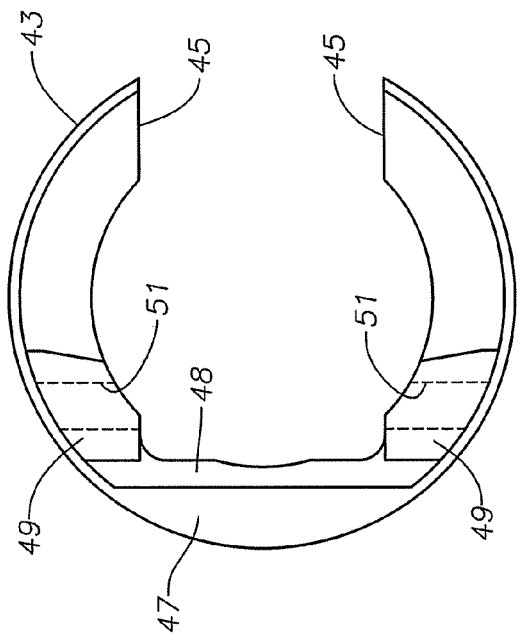
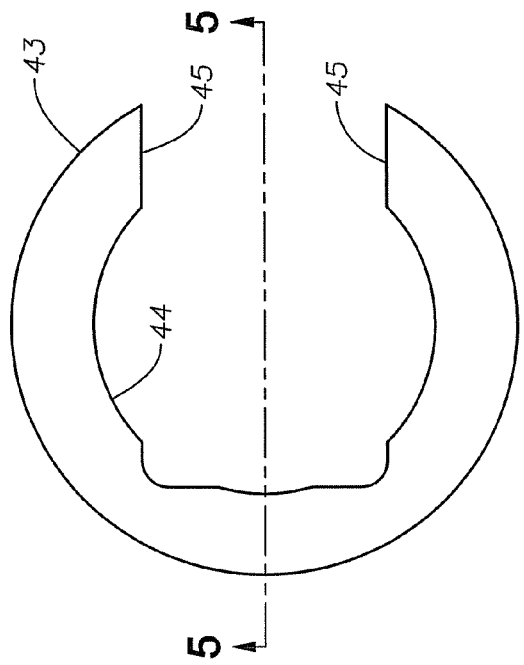
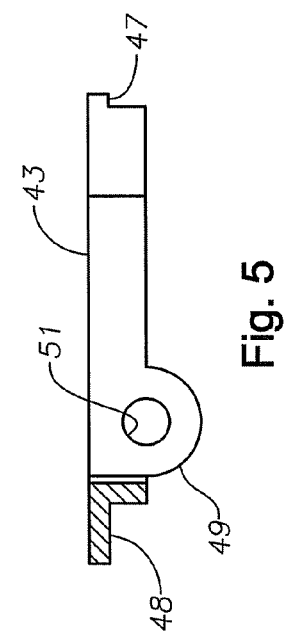
Fig. 4
Fig. 5
Fig. 6
Fig. 7

FLOWLINE FLAPPER VALVE

CROSS-REFERENCE TO RELATED APPLICATION

This application claims priority to provisional application Ser. No. 61/170,917, filed Apr. 20, 2009.

FIELD OF THE INVENTION

This invention relates in general to a flowline check valves, and particularly a flapper valve for use in oilfield service operations.

BACKGROUND OF THE INVENTION

Check valves are commonly used in well hydraulic fracturing operations. Large pumps are connected by flow lines to a well for pumping a liquid such as water into the well at high pressures to fracture the earth formation. Various check valves are coupled into the flow lines to prevent back flow to the pumps.

A typical check valve has a body with upstream and downstream flow passages separated by a central cavity. A valve seat is pressed with an interference fit into the downstream flow passage. A flapper assembly is inserted through an access bore in the body for engaging the valve seat.

While this type of check valve works well, a high flow rate through the check valve may tend to cause the seat to dislodge from the flow passage. Other improvements are also desirable, such as simplifying the flapper assembly.

SUMMARY

The flapper valve assembly has a body with upstream and downstream flow passages separated by a cavity. An access bore extends into the cavity transverse to the flow passages. The valve seat is secured by a threaded arrangement in the upstream flow passage, rather than by press fitting. A holder for a flapper is supported on a support shoulder in the access bore. The flapper is pivotally mounted to the holder and extends into the cavity. An anti-rotation device prevents rotation of the holder in the access bore.

In the preferred embodiment, the anti-rotation device comprises a straight edge portion formed in the access bore below the shoulder. The holder has a depending lip with a straight edge portion that engages the straight edge portion in the access bore.

The support shoulder has a wider section above the seat in the preferred embodiment. A fastener extends through a hole in the wider portion of the support shoulder into engagement with the seat to prevent rotation of the seat.

Preferably, the seat has an upstream side that abuts and is sealed to a downstream facing shoulder in the upstream passage in the body. The seat may have an external flange on its downstream side. In the preferred embodiment, the flange has an upstream facing shoulder that is spaced from an upstream wall of the cavity by a gap. The fastener may be a set screw that engages the rim of the flange.

BRIEF DESCRIPTION OF THE DRAWINGS

FIG. 4 is a top view of a holder for the flapper valve of FIG. 1.

FIG. 5 is a sectional view of the holder of FIG. 4, taken along the line 5-5 of FIG. 4.

FIG. 6 is a bottom view of the holder of FIG. 4.

FIG. 7 is a side elevational view, as seen from the right side, of the holder of FIG. 4.

DETAILED DESCRIPTION OF THE INVENTION

Figure 2:
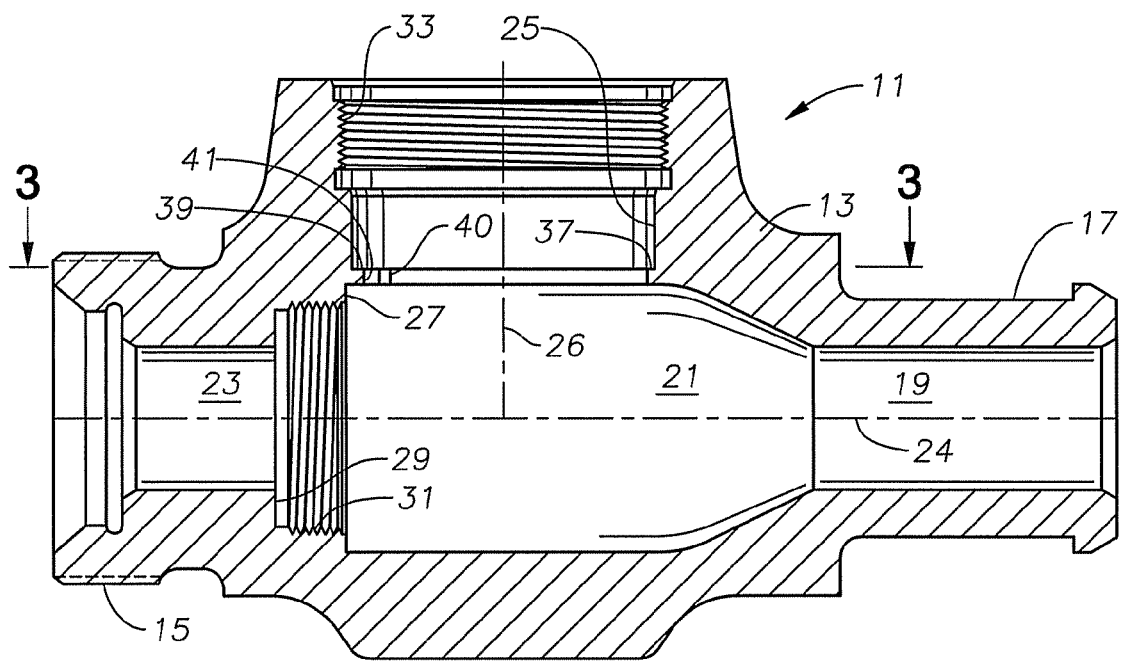
FIG. 2 is a sectional view of the body of the flapper valve of FIG. 1, with the components removed.

Referring to FIG. 2, flapper valve 11 has a body 13 with an upstream end 15 and a downstream end 17. Body 13 is normally connected into a flowline that will have flow in a single direction, which is from the upstream end 15 toward the downstream end 17. In this example, upstream end 15 has external threads for receiving a collar of a conventional coupling union. Downstream end 17 is in the mating configuration of the coupling union. However downstream and upstream ends 17, 15 could be reversed. Also, other types of connections rather than union type couplings could be utilized, such as clamps.

Body 13 has an upstream passage 23, a central cavity or chamber 21, and a downstream passage 19. Upstream passage 23 and downstream passage 19 are coaxial along a flow passage axis 24. An access bore 25 is formed in body 13 for access to central chamber 21. Access bore 25 is located on an axis 26 that is preferably perpendicular to and intersects flow passage axis 24.

An upstream wall or shoulder 27 is located at an intersection between the upstream end of central chamber 21 and upstream passage 23. This shoulder, referred to herein as junction shoulder 27, is in a plane perpendicular to axis 24. Upstream passage 23 has a counterbore that begins at junction shoulder 27 and extends upstream a selected distance, terminating at a counterbore shoulder 29. Counterbore shoulder 29 is also in a plane perpendicular to axis 24 and faces downstream. A set of threads 31 is formed in upstream passage 23 between junction shoulder 27 and counterbore shoulder 29. Preferably, threads 31 begin at junction shoulder 27 and terminate before reaching counterbore shoulder 29.

Figure 3:
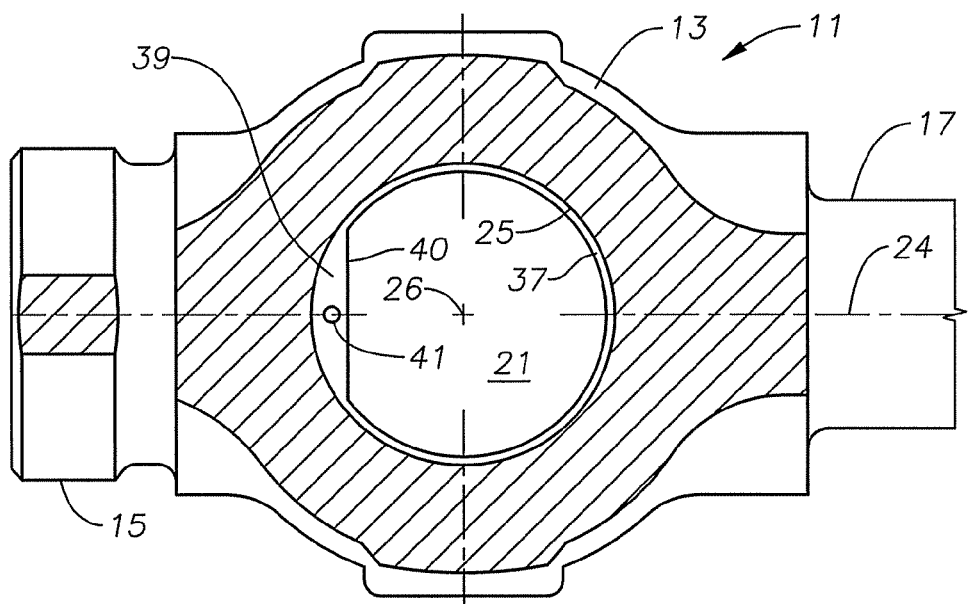
FIG. 3 is a sectional view of the body of the flapper valve taken along the line 3-3 of FIG. 2.

Access bore 25 also has a set of internal threads 33. Threads 33 are adapted to receive a cap 35, shown by dotted lines in FIG. 1, which forms a seal within access bore 25. An access bore support shoulder 37 faces upward towards threads 33. Access bore shoulder 37 is annular but has a greater radial dimension or width relative to access bore axis 26 on its upstream side, defining a ledge 39. The radial dimension of ledge 39 is the radial distance along a radial line from axis 26 from the sidewall of access bore 25 to the end 40 of ledge 39. End 40 of ledge 39, which is also shown in FIG. 3, is a straight edge located in a plane perpendicular to flow passage axis 24. Ledge end 40 could be other than straight, however. A hole 41, preferably threaded, is located within ledge 39 and extends downward into central chamber 21.

Referring also to FIG. 4, a holder 43 is supported on access bore shoulder 37 and ledge 39. Holder 43 is flat disk having a large central opening 44. In this example, holder 43 has a horse shoe shape, with two downstream ends 45 that define a gap or entrance to inner opening 44; however ends 45 could be eliminated to make holder 43 completely annular, if desired. As shown in FIG. 5, holder 43 has a depending lip 47 that extends along its periphery. Lip 47 has a portion that has approximately the same radial dimension as access bore shoulder 37, relative to access bore axis 26. As shown in FIG. 6, lip 47 has a greater radial dimension or thickness on its upstream side that matches the radial dimension of ledge 39. Lip 47 has a straight edge portion 48 that matches and contacts axis bore shoulder straight edge portion 40. When in flush contact with each other straight edge portions 40, 48 serve as an anti-rotation device to prevent rotation of holder 43.

As shown also in FIGS. 6 and 7, holder 43 has two spaced-apart hinge blocks 49 on its lower side. Hinge blocks 49 are located at the upstream side of holder 43 and are spaced apart from each other by inner opening 44. Each hinge block 49 has a hole 51 extending through it. As shown in FIG. 5, each hole 51 is preferably oblong. The center points of holes 51 coincide with each other.

Figure 1:
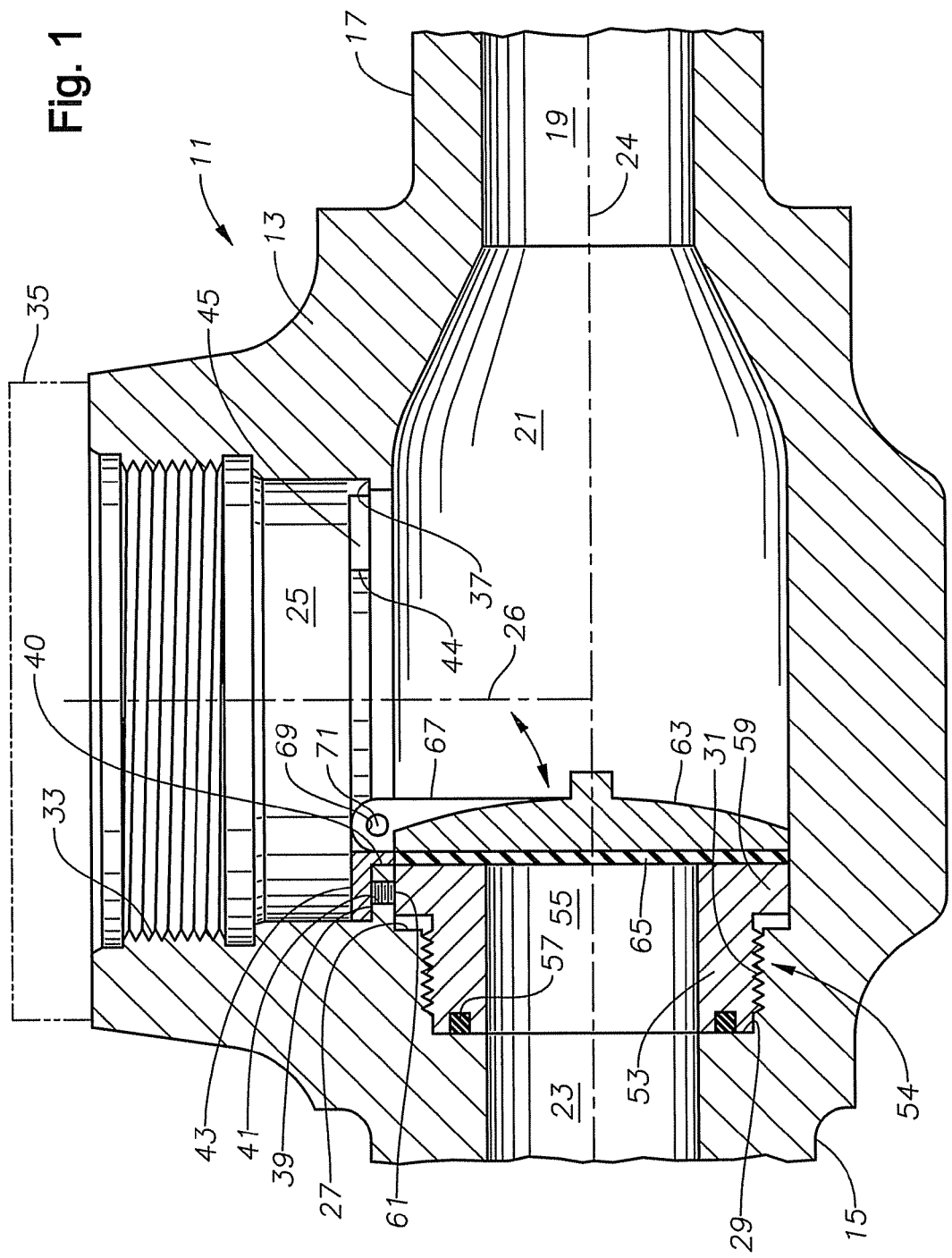
FIG. 1 is a sectional view of a flapper valve constructed in accordance with this invention.

Referring to FIG. 1, a seat 53 has exterior threads 54 that engage internal threads 31 of upstream passage 23. Rather than locating exterior threads 54 directly on seat 53, other threaded arrangements are feasible, such as employing a separate threaded retainer ring. Seat 53 has an orifice or seat passage 55 that extends through it; passage 55 is coaxial with and the same diameter as flowline passages 23 and 19. Seat 53 has a circular seal 57 on its upstream end that abuts and seals against counterbore shoulder 29. As best shown in FIG. 1, an outer diameter of circular seal 57 can be less than an outer diameter of seat 53 and an inner diameter of circular seal 57 can be greater than an inner diameter of seat 53. Therefore, seal 57 can be located on the face of the upstream end of seat 53 and spaced apart from the circumference of seat 53. Alternately, a seal around a circumference of the upstream end of seat 53 in engagement with an unthreaded portion of upstream passage 23 may be feasible. Seat 53 has an external flange 59 on its downstream end that has a greater outer diameter than its threads 54. The outer diameter of flange 59 is approximately the same as the inner diameter of central chamber 21 at the upstream end of central chamber 21. Flange 59 has an upstream facing side that is spaced from junction Shoulder 27 by a gap. A set screw 61 extends through hole 51 and engages the outer diameter of flange 59 to prevent seat 53 from loosening from threads 31.

Figure 8:
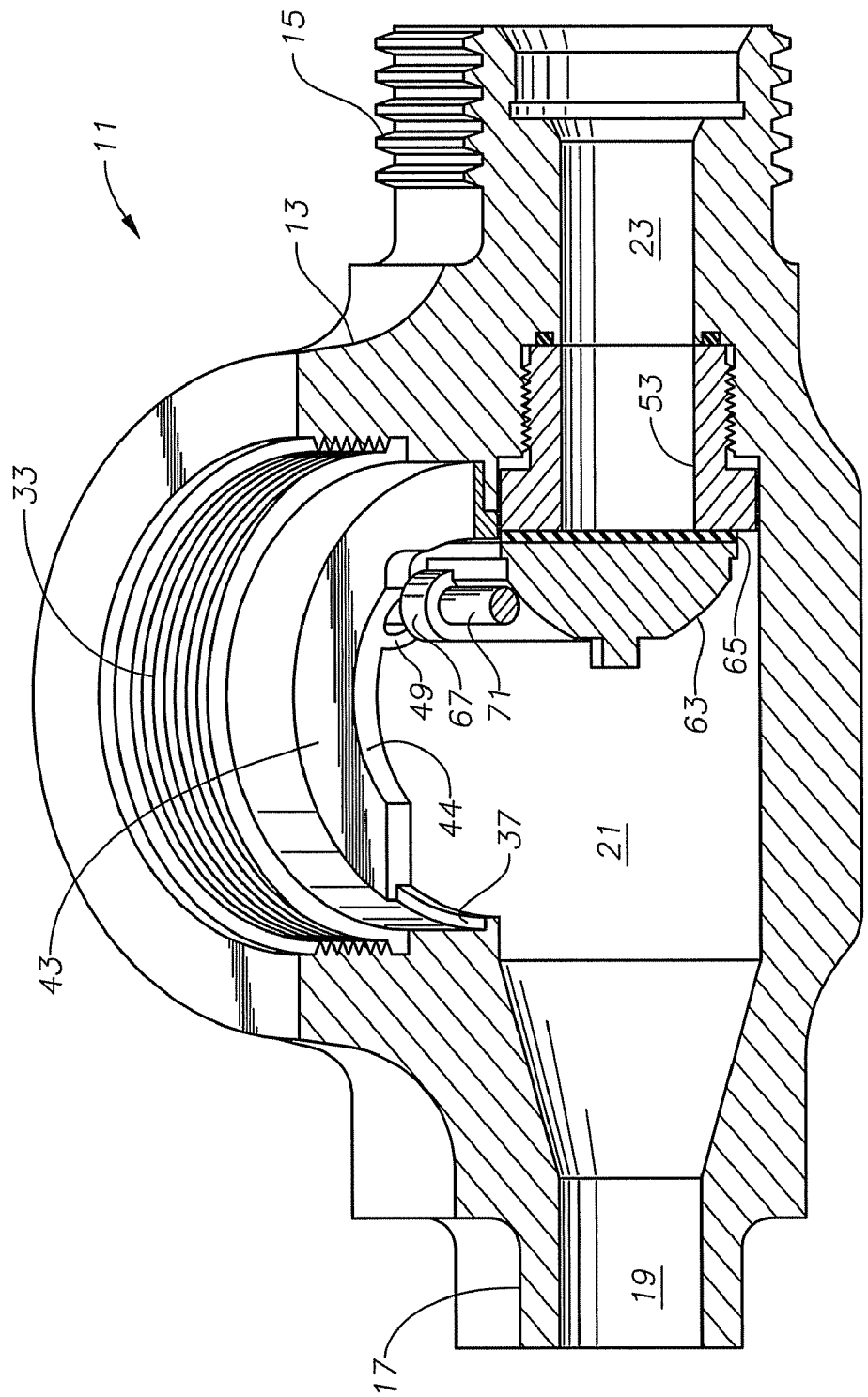
FIG. 8 is a perspective view, partially sectioned, of the flapper valve of FIG. 1.

Referring still to FIG. 1, a flapper 63 may have a gasket 65 on its upstream side for engaging the downstream side of seat 53 to block any reverse flow from central chamber 21 into upstream passage 23. Flapper 63 is pivotally connected to holder 43 by a clevis 67 comprising two lugs (only one shown). Clevis 67 fits between the two hinge blocks 49 (FIG. 6). Clevis 67 has cylindrical holes 69 that align with hinge block oblong holes 51 (FIG. 6). A single pin 71 extends through holes 69 and 51 to pivotally secure flapper 63 to holder 43. FIG. 8 illustrates one of the arms of clevis 67 and pin 71.

Flapper valve 11 is assembled by securing seat 53 to threads 31. Set screw 61 will be secured against seat flange 59. Clevis 67 is pinned to holder 43, and then the assembly of flapper 63 and holder 43 is inserted into access bore 25. Holder 43 will self-align itself because its hinge blocks 49 will abut end 40 of ledge 39 as well as lip straight edge portion 48. The engagement of the hinge blocks 49 and lip straight edge portion 48 with ledge end 40 prevents any rotation of holder 43 about axis 26 of access bore 25. Cap 35 is then secured into access bore 25 to form a seal with access bore 25. A lower portion of cap 35 abuts an upper side of holder 43 to retain holder 43 on access bore shoulder 37.

In operation, the normal flow will be from the left side of FIG. 1 toward the right. The flow from upstream passage 23 to the right causes flapper 63 to swing open as indicated by the arrow. When the flow pressure ceases, gravity will cause flapper 63 to move back to the position shown in FIG. 1. If by accident, the fluid pressure becomes higher in downstream passage 19 than in upstream passage 23, the engagement of flapper 63 with seat 53 will prevent any flow in the reverse direction. The threaded engagement of seat 53 in upstream flow passage 23 reduces the chance for downstream flow to dislodge seat 53 from upstream flow passage 23.

While the invention has been shown in only one of its forms, it should be apparent to those skilled in the art that it is not so limited but is susceptible to various changes without departing from the scope of the invention.

The invention claimed is:

1. A check valve assembly, comprising:
    a body having a central cavity intersected by upstream and downstream flow passages, the flow passages having a common flow passage axis, the upstream passage having a counterbore that defines a downstream facing shoulder;
    a seat having a central orifice therethrough and secured by a threaded engagement into the upstream flow passage, a downstream side of the seat having a larger diameter than an upstream side of the seat, defining a flange having an upstream facing shoulder that is spaced apart from an upstream wall of the cavity by a gap and an upstream end of the seat abutting the downstream facing shoulder of the body, the upstream side of the seat having a seal that abuts and seals against the downstream facing shoulder of the body;
    an access bore intersecting the cavity, the access bore having an access bore axis that is transverse to the flow passage axis;
    a support shoulder formed in the access bore;
    a holder insertable into the access bore, the holder extending at least partially around the access bore and landed on the support shoulder; and
    a flapper pivotally secured to the holder and located in the cavity for movement between an open position and a closed position blocking flow through the orifice of the seat.

2. The check valve assembly according to claim 1, further comprising:
    an anti-rotation device having one portion on the holder and one portion on the support shoulder, the anti-rotation device preventing rotation of the holder.

3. The check valve assembly according to claim 1, further comprising:
    a straight edge extending toward the cavity from the support shoulder; and
    a lip extending from the holder, the lip having a straight portion that registers with the straight edge.

4. The check valve assembly according to claim 1, wherein:
    the support shoulder extends continuously around an inner diameter of the access bore;
    the support shoulder has a greater width portion in one area than remaining portions of the support shoulder;
    a hole is formed in the greater width portion; and
    a fastener extends through the hole and into engagement with the seat, the fastener preventing the seat from rotating within the upstream passage.

5. The check valve assembly according to claim 1, wherein the holder comprises:
    a disk having a central opening therethrough; and
    wherein the flapper is pivotally secured to the disk by a pin and clevis arrangement.

6. The check valve assembly according to claim 1, wherein:
    the upstream flow passage has a set of internal threads; and the seat has a set of external threads that secure to the internal threads.

7. The check valve assembly according to claim 1, wherein:
an outer diameter of the seal is less than an outer diameter of the seat and an inner diameter of the seal is greater than an inner diameter of the seat.

8. The check valve assembly according to claim 1, further comprising:
a set of threads formed in the access bore outward from the support shoulder;
a cap that secures to the threads in the access bore and contacts the holder to retain the holder on the support shoulder.

9. A check valve assembly, comprising:
a body having a central cavity intersected by upstream and downstream flow passages, the flow passages having a common flow passage axis;
the upstream flow passage having a set of internal threads adjacent the cavity and a downstream facing shoulder upstream from the internal threads;
a seat having upstream and downstream sides, a central orifice therethrough, a circumference having a set of external threads that engage the internal threads in the upstream flow passage, the upstream side of the seat having a seal and abutting the downstream facing shoulder and the downstream side of the seat having a larger diameter than an upstream side of the seat, defining a flange having an upstream facing shoulder that is spaced apart from an upstream wall of the cavity by a gap;
an access bore intersecting the cavity, the access bore having an access bore axis that is perpendicular to the flow passage axis;
a support shoulder formed in the access bore and facing upward, the support shoulder extending at least partly around an inner diameter of the access bore adjacent a junction of the access bore with the cavity;
a holder insertable into the access bore, the holder being a disk with a central opening in communication with the cavity, the holder extending at least partially around the access bore and being supported on the support shoulder;
a hinge block on the holder;
an anti-rotation device in the access bore and on the holder that prevents rotation of the holder; and
a flapper pivotally secured to the hinge block on the holder by a pin and located in the cavity for movement between an open position and a closed position blocking flow through the orifice of the seat.

10. The check valve assembly according to claim 9, wherein the anti-rotation device comprises:
a straight edge extending downward from the support shoulder; and
a lip extending downward from the holder, the lip having a straight portion that registers with the straight edge to assure orientation of the holder with the seat.

11. The check valve assembly according to claim 9, wherein:
the support shoulder extends continuously around the inner diameter of the access bore in a plane perpendicular to the access bore axis;
the support shoulder has a greater width portion above the seat than remaining portions of the support shoulder;
a hole is formed in the greater width portion; and
a fastener extends through the hole and into engagement with the seat, the fastener preventing the seat from rotating within the upstream passage.

12. The check valve assembly according to claim 9, wherein:
an outer diameter of the seal is less than an outer diameter of the seat and an inner diameter of the seal is greater than an inner diameter of the seat.

13. The check valve assembly according to claim 9, wherein the anti-rotation device comprises:
a straight edge extending downward from the support shoulder; and
wherein the hinge block engages the straight edge.

14. The check valve assembly according to claim 9, further comprising:
a set of threads formed in the access bore above the support shoulder; and
a cap that secures to the threads in the access bore and abuts an upper side of the holder to retain the holder on the support shoulder.

15. A check valve assembly, comprising:
a body having a central cavity intersected by upstream and downstream flow passages, the flow passages having a common flow passage axis, the upstream passage having a counterbore that defines a downstream facing shoulder;
the upstream flow passage having a set of internal threads;
a seat having upstream and downstream sides, a central orifice therethrough, the upstream side a set of external threads that engage the internal threads in the upstream flow passage, and an external flange on the upstream side of the seat that is spaced apart from an upstream wall of the cavity by a gap and the upstream side of the seat having a seal and abutting the downstream facing shoulder of the body;
an access bore intersecting the cavity, the access bore having an access bore axis that is perpendicular to then passage axis;
a support shoulder formed around an inner diameter of the access bore, facing upward, and located in a plane perpendicular to the access bore axis;
a fastener extending through a hole in the support shoulder into engagement with the flange of the seat to prevent the seat from rotation;
a holder insertable into the access bore, the holder being a disk with a central opening, the holder being supported on the support shoulder;
at least one hinge block on the holder;
a straight edge portion extending downward from the support shoulder and engaged by the holder to prevent rotation of the holder; and
a flapper pivotally secured to the at least one hinge block on the holder and a pin, and located in the cavity for movement between an open position and a closed position blocking flow through the orifice of the seat.

16. The check valve assembly according to claim 15, wherein:
the at least one hinge block comprises a pair of hinge blocks spaced apart from each other.

17. The check valve assembly according to claim 15, wherein the holder has a configuration generally in the shape of a horse shoe.

18. The check valve assembly according to claim 15, wherein the holder is removable from the access bore separate from the seat.

* * * * *

UNITED STATES PATENT AND TRADEMARK OFFICE
CERTIFICATE OF CORRECTION

| | | |
|---|---|---|
| PATENT NO. | : 8,261,771 B2 | Page 1 of 1 |
| APPLICATION NO. | : 12/763786 | |
| DATED | : September 11, 2012 | |
| INVENTOR(S) | : Nuder Said et al. | |

It is certified that error appears in the above-identified patent and that said Letters Patent is hereby corrected as shown below:

In the Specification:

At column 3, line number 27, please replace [begreater] with -- be greater --.

At column 3, line number 38, please replace [Shoulder] with -- shoulder --.

In the Claims:

At column 4, claim number 1, line number 17, please replace [couterbore] with -- counterbore --.

At column 6, claim number 15, line number 35, please replace [perpendicular to then] with -- perpendicular to the flow --.

Signed and Sealed this
Eleventh Day of December, 2012

David J. Kappos
*Director of the United States Patent and Trademark Office*